(12) United States Patent
Hashizume

(10) Patent No.: US 9,836,676 B2
(45) Date of Patent: Dec. 5, 2017

(54) COLOR IMAGE PROCESSING APPARATUS, CONTROL METHOD THEREFOR, AND PROGRAM FOR EXECUTING IMAGE PROCESSING METHOD

(71) Applicant: CANON KABUSHIKI KAISHA, Tokyo (JP)

(72) Inventor: Asako Hashizume, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 14/747,475

(22) Filed: Jun. 23, 2015

(65) Prior Publication Data

US 2015/0286907 A1 Oct. 8, 2015

Related U.S. Application Data

(63) Continuation of application No. 14/080,508, filed on Nov. 14, 2013, now Pat. No. 9,092,719.

(30) Foreign Application Priority Data

Nov. 16, 2012 (JP) .................................. 2012-251883
Nov. 16, 2012 (JP) .................................. 2012-251884

(51) Int. Cl.
*H04N 1/60* (2006.01)
*G06K 15/02* (2006.01)
(Continued)

(52) U.S. Cl.
CPC ..... *G06K 15/1878* (2013.01); *G03G 15/5041* (2013.01); *H04N 1/00015* (2013.01);
(Continued)

(58) Field of Classification Search
CPC combination set(s) only.
See application file for complete search history.

(56) References Cited

U.S. PATENT DOCUMENTS 5,712,930 A * 1/1998 Watanabe ............... H04N 1/407
358/519
6,137,596 A * 10/2000 Decker ................ H04N 1/6033
358/1.9
(Continued)

FOREIGN PATENT DOCUMENTS

| CN | 101387844 A | 3/2009 |
|---|---|---|
| CN | 102385271 A | 3/2012 |
| JP | 2009-069606 A | 4/2009 |
| JP | 2010-263345 A | 11/2010 |

*Primary Examiner* — Richard Zhu
(74) *Attorney, Agent, or Firm* — Canon U.S.A., Inc. IP Division

(57) ABSTRACT

A color image processing apparatus includes an image forming unit configured to form a color image using recording materials of plural colors, an image processing unit configured to implement plural image processing methods that achieve plural types of pseudo-halftone representations, a color measurement unit configured to perform color measurement of the color image formed by the image forming unit, and a control unit configured to control execution of multi-color calibration in which the color measurement unit performs color measurement of a pattern image including plural multi-color patch images formed using recording materials of plural colors by using a smaller number of image processing methods than plural image processing methods used in single-color calibration for correcting reproduction characteristics of single-color images formed by the image forming unit and in which reproduction characteristics of a multi-color image formed by the image forming unit are corrected using a result of the color measurement.

16 Claims, 10 Drawing Sheets

(51) Int. Cl.
*G03G 15/00* (2006.01)
*H04N 1/00* (2006.01)

(52) U.S. Cl.
CPC ..... *H04N 1/00023* (2013.01); *H04N 1/00031* (2013.01); *H04N 1/00034* (2013.01); *H04N 1/00045* (2013.01); *H04N 1/00063* (2013.01); *H04N 1/00087* (2013.01); *H04N 1/60* (2013.01); *H04N 1/6033* (2013.01); *H04N 1/6036* (2013.01); *H04N 1/6038* (2013.01); *H04N 1/6044* (2013.01); *G03G 2215/00059* (2013.01); *G03G 2215/00063* (2013.01); *G03G 2215/00067* (2013.01); *H04N 2201/0094* (2013.01)

(56) References Cited

U.S. PATENT DOCUMENTS

| | | | | |
|---|---|---|---|---|
| 6,474,768 B1 * | 11/2002 | Yano | ............ | H04N 1/6033 347/19 |
| 6,603,566 B1 * | 8/2003 | Shono | ............ | H04N 1/4078 358/1.13 |
| 8,339,690 B2 * | 12/2012 | Sivan | ............ | H04N 1/4055 358/1.9 |
| 8,422,898 B2 * | 4/2013 | Nakatsuji | ............ | G03G 15/5041 347/116 |
| 2009/0073469 A1 * | 3/2009 | Kita | ............ | G03G 15/5029 358/1.9 |
| 2010/0165367 A1 * | 7/2010 | Nomura | ............ | G03G 15/5062 358/1.9 |

* cited by examiner

|  | IMAGE PROCESSING METHOD A | IMAGE PROCESSING METHOD B | IMAGE PROCESSING METHOD C | NUMBER OF CHART IMAGES |
|---|---|---|---|---|
| NO RECONFIGURATION | 200 PATCHES | 200 PATCHES | 200 PATCHES | 3 |
| RECONFIGURATION AT 6:1:3 | 200 PATCHES | 0 PATCHES | 200 PATCHES | 2 |
| RECONFIGURATION AT 3:3:4 | 100 PATCHES | 100 PATCHES | 200 PATCHES | 2 |

COLOR IMAGE PROCESSING APPARATUS, CONTROL METHOD THEREFOR, AND PROGRAM FOR EXECUTING IMAGE PROCESSING METHOD

CROSS-REFERENCE TO RELATED APPLICATIONS

This application is a Continuation of U.S. patent application Ser. No. 14/080,508, filed Nov. 14, 2013 (now U.S. Pat. No. 9,092,719), which claims priority from Japanese Patent Application No. 2012-251883, filed Nov. 16, 2012, and from Japanese Patent Application No. 2012-251884, filed Nov. 16, 2012. Each of U.S. patent application Ser. No. 14/080,508, Japanese Patent Application No. 2012-251883, and Japanese Patent Application No. 2012-251884 is hereby incorporated by reference herein in its entirety.

BACKGROUND OF THE INVENTION

Field of the Invention

The present invention relates to a color image processing apparatus for correcting a color in an image output from a printer, a control method for the color image processing apparatus, and a program for creating image processing parameters.

Description of the Related Art

In recent years, with the improvement in the performance of electrophotographic devices (Xerographic printers), machines that realize image quality equivalent to that of inkjet printers have been emerging. However, due to their inherent instability, electrophotographic devices have a larger amount of variation in color than inkjet printers. In order to address such a problem, there are various calibration techniques for electrophotographic devices of the related art.

One such calibration technique for electrophotographic devices (xerographic printers) of the related art is used for the correction of primary colors, and involves creating a look-up table (LUT) for use in one-dimensional gradation correction for each of cyan, magenta, yellow, and black toners. A LUT is a table indicating output data corresponding to input data that is divided at specific intervals, and enables the representation of non-linear characteristics, which are difficult to represent with arithmetic expressions. Calibration of a "single color" (hereinafter referred to as "single-color calibration"), which refers to a color represented using a single cyan (C), magenta (M), yellow (Y), or black (K) toner, allows correction of the reproduction characteristics of a single-color image, such as maximum density and gradation.

In recent years, furthermore, a technique for "multi-color" calibration using a four-dimensional LUT has been proposed in Japanese Patent Laid-Open No. 2011-254350. The term "multi-color" refers to a representation of a color produced using a plurality of toners, such as red, green, or blue, which is made up of two of cyan, magenta, and yellow, or gray, which is made up of cyan, magenta, and yellow. Particularly, in the electrophotographic system, even if the gradation characteristics of single colors are corrected using one-dimensional LUTs, a "multi-color" representation produced using a plurality of toners may exhibit a non-linear difference. Multi-color calibration corrects the color reproduction characteristics of a multi-color image represented with a combination (such as superimposition) of a plurality of colors of toners.

The workflow for calibration including multi-color calibration will now be described. First, in order to carry out single-color calibration, a patch image is printed on a recording medium such as a sheet of paper using chart data formed of a single color. The patch image is an image for measurement having a certain area with a single density. A plurality of such patch images are generated with different colors, and are printed on a recording medium. An image formed in this way is referred to as a "pattern image". A recording medium such as a sheet of paper having a pattern image printed thereon is scanned by a scanner or a sensor to read patch images. One-dimensional LUTs are created in which data obtained by reading the patch images is compared with preset target values to correct the differences from the target values. Then, in order to carry out multi-color calibration, patch images are printed on a recording medium using multi-color chart data that reflects the previously created one-dimensional LUTs, and are read using a scanner or a sensor. A four-dimensional LUT is created in which data obtained by reading the patch images is compared with preset target values to correct the differences from the target values.

Generally, in terms of the reproducibility of colors output from an electrophotographic device (xerographic printer), the influence caused by different image processing methods, which are pseudo-halftone methods, needs to be also taken into account. The image processing methods mainly include two types, e.g., error diffusion and dithering, to implement a pseudo-halftone process. The image processing methods give different gradation characteristics for error diffusion and dithering. Different image processing methods cause the reproducibility of a color to differ. Thus, correction LUTs are used for the respective image processing methods. In other words, calibration is required for every image processing method. However, performing calibration for every image processing method is time and labor consuming. In addition, a large number of consumables such as sheets and toner are also required. To remedy such inconvenience, methods for making single-color calibration as simple as possible have been proposed. Japanese Patent Laid-Open No. 2000-101836 discloses that single-color calibration is performed for one type of image processing method and correction LUTs for the other types of image processing methods are created using conversion tables for image processing methods, which are created by experiment in advance. Thus, LUTs may be created without an increase in user workload.

In the related art, single-color calibration, which would otherwise be performed for every image processing method, is made simple with accuracy maintained as high as possible. The techniques disclosed in the related art thus do not guarantee the reproduction characteristics of a multi-color image.

In general, performing multi-color calibration in a way similar to that for single-color calibration results in an increase in the number of sheets to be used or the amount of toner. Furthermore, multi-color calibration may require consumables such as sheets and toner, and also require a substantial amount of time to perform calibration and user effort as well.

SUMMARY OF THE INVENTION

Accordingly, in an aspect of the present invention, a color image processing apparatus includes an image forming unit configured to form a color image using recording materials of a plurality of colors; an image processing unit configured to implement a plurality of image processing methods that achieve a plurality of types of pseudo-halftone representations; a color measurement unit configured to perform color measurement of the color image formed by the image forming unit; and a control unit configured to control the execution of multi-color calibration in which the color measurement unit performs color measurement of a pattern image including a plurality of multi-color patch images formed using recording materials of a plurality of colors and in which reproduction characteristics of a multi-color image formed by the image forming unit are corrected using a result of the color measurement, and configured to control the execution of single-color calibration for correcting reproduction characteristics of single-color images formed by the image forming unit. The control unit is configured so that, when the color image processing apparatus performs calibration, it performs single-color calibration and performs multi-color calibration for fewer than all of the image processing methods.

An aspect of the present invention allows suppression of an increase in the consumption of sheets and toner and an increase in user workload, and allows efficient correction of the reproduction characteristics of a multi-color image.

Further features of the present invention will become apparent from the following description of exemplary embodiments with reference to the attached drawings.

DESCRIPTION OF THE EMBODIMENTS

First Exemplary Embodiment

First, multi-color calibration, which constitutes a feature of this exemplary embodiment, will be described by comparison with single-color calibration. As described in the previous section, it is anticipated that when multi-color calibration is executed, single-color calibration has been completed and gradations of single colors have been corrected. Since the reproduction characteristics of single-color images are more likely to be affected by image processing methods, single-color calibration needs to be performed for each type of image processing method. In addition, due to the unstable color reproducibility of highlight colors, for example, it is required to increase the number of patch images in a highlighted area.

In a multi-color image, in contrast, since color plates for cyan, magenta, yellow, and black overlap, the colors in the image are greatly affected by the transfer or fixing step in the printing process.

Specifically, a multi-color patch image that is formed when multi-color calibration is executed has a high dot percentage (greater than or equal to 10 to 15%) because of the overlapping of color plates. The formation of a multi-color patch image thus causes less color difference in accordance with a difference in image processing method than the formation of a single-color patch image.

Accordingly, unlike single-color calibration in which differences caused by image processing methods are corrected or gradations are corrected, multi-color calibration may be a process for correcting a deviation of reproduction characteristics which is caused by changes in the state of an engine.

Furthermore, whereas single-color calibration uses single colors, multi-color calibration uses a color of a mixture of cyan, magenta, yellow, and black for correction.

For this reason, it is readily anticipated that the amount of toner to be used to print a chart image used for multi-color calibration will be larger than the amount of toner to be used to print a chart image used for single-color calibration.

It is also readily anticipated that executing single-color calibration and multi-color calibration for each image processing method will increase the number of sheets on which chart images to be output are printed.

In this exemplary embodiment, accordingly, single-color calibration is performed for every image processing method, whereas multi-color calibration is performed for only one type of image processing method. Thus, an efficient calibration workflow with maintained accuracy of multi-color calibration and minimized or reduced consumption of sheets and toner may be achieved.

Embodiments of the present invention will now be described with reference to the drawings.

Figure 1:
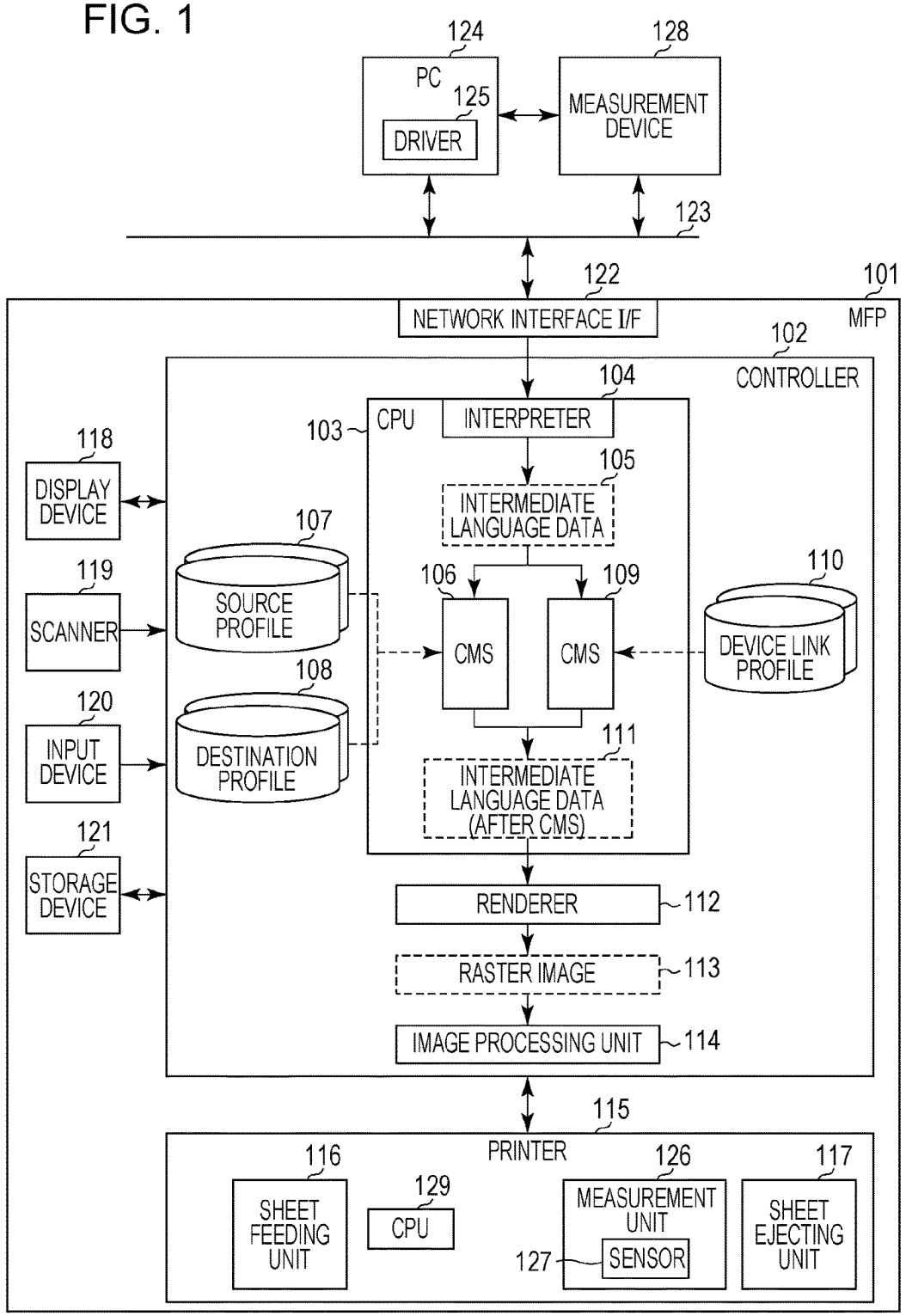
FIG. 1 is a configuration diagram of a system.

FIG. 1 is a configuration diagram of a system according to this exemplary embodiment. A multifunction printer (MFP) 101, which is a color image processing apparatus in which cyan, magenta, yellow, and black (hereinafter referred to as "C", "M", "Y", and "K", respectively) toners are used, is connected to another network-based device via a network 123. A personal computer (PC) 124 is connected to the MFP 101 via the network 123. A printer driver 125 in the PC 124 transmits print data to the MFP 101.

The MFP 101 will now be described in detail. A network interface (I/F) 122 receives print data and so forth. A controller 102 includes a central processing unit (CPU) 103, a renderer 112, and an image processing unit 114. In the CPU 103, an interpreter 104 interprets a page description language (PDL) portion of received print data, and generates intermediate language data 105.

A color management system (CMS) 106 performs color conversion using a source profile 107 and a destination profile 108, and generates intermediate language data (after CMS) 111. A CMS is configured to perform color conversion using profile information described below. The source profile 107 is a profile for converting a device-dependent color space such as the RGB or CMYK color space into a device-independent color space defined by the International Commission on Illumination (CIE), such as the L*a*b* (hereinafter referred to as "Lab") or XYZ color space. The XYZ color space is a device-independent color space like the Lab color space, and provides a color representation using tristimulus values. The destination profile 108 is a profile for converting a device-independent color space into the CMYK color space, which is dependent on a device (a printer 115).

In contrast, a CMS 109 performs color conversion using a device link profile 110, and generates intermediate language data (after CMS) 111. The device link profile 110 is a profile for converting a device-dependent color space such as the RGB or CMYK color space directly into the CMYK color space, which is dependent on a device (the printer 115). Which of the CMS 106 and the CMS 109 is to be selected depends on the settings in the printer driver 125.

In this exemplary embodiment, CMSs (106 and 109) are classified by profile type (the profiles 107, 108, and 110). Alternatively, one CMS may handle a plurality of types of profiles. The types of profiles are not limited to the examples given in this exemplary embodiment, and any type of profile may be used so long as the CMYK color space, which is dependent on the printer 115, is used.

The renderer 112 generates a raster image 113 from the generated intermediate language data (after CMS) 111. The image processing unit 114 performs image processing on the raster image 113 or an image read using a scanner 119. The details of the image processing unit 114 will be described below.

The printer 115 connected to the controller 102 is a printer configured to form a color image based on output data on a sheet of paper using colored toners such as C, M, Y, and K toners. The printer 115 includes a sheet feeding unit 116 configured to feed sheets, a sheet ejecting unit 117 configured to eject a sheet on which an image is formed, and a measurement unit 126.

The measurement unit 126 includes a sensor 127 serving as a color measurement unit configured to acquire spectral reflectance and values of a device-independent color space such as the Lab or XYZ color space, and is controlled by a CPU 129 configured to control the printer 115. The measurement unit 126 measures a patch image printed on a recording medium such as a sheet of paper using the printer 115. The patch image is an image for measurement having a certain area with a single density. A plurality of such patch images are generated with different colors, and are printed on a recording medium. An image formed in this way is referred to as a "pattern image". The pattern image is read using the sensor 127 included in the measurement unit 126, and numerical information on read values is transmitted to the controller 102. The controller 102 performs computation using the numerical information, and uses the results of the computation to execute single-color calibration or multi-color calibration.

A display device 118 is a user interface (UI) on which instructions presented to the user or the state of the MFP 101 is displayed. The display device 118 is used to execute single-color calibration or multi-color calibration described below.

The scanner 119 is a scanner including an auto document feeder. The scanner 119 irradiates a bundle of document images or one document image with light from a light source (not illustrated), and forms a reflected document image on a solid-state imaging element such as a charge coupled device (CCD) sensor using a lens. Further, the scanner 119 obtains a raster image read signal from the solid-state imaging element as image data.

An input device 120 is an interface through which an input is received from the user. Part of the input device 120 may be formed as a touch panel, and may be integrally formed with the display device 118.

A storage device 121 saves data processed by the controller 102, data received by the controller 102, and so forth.

A measurement device 128 is an external device used for measurement which is connected to the network 123 or the PC 124. Similarly to the measurement unit 126, the measurement device 128 is configured to acquire spectral reflectance and values of a device-independent color space such as the Lab or XYZ color space.

Figure 2:
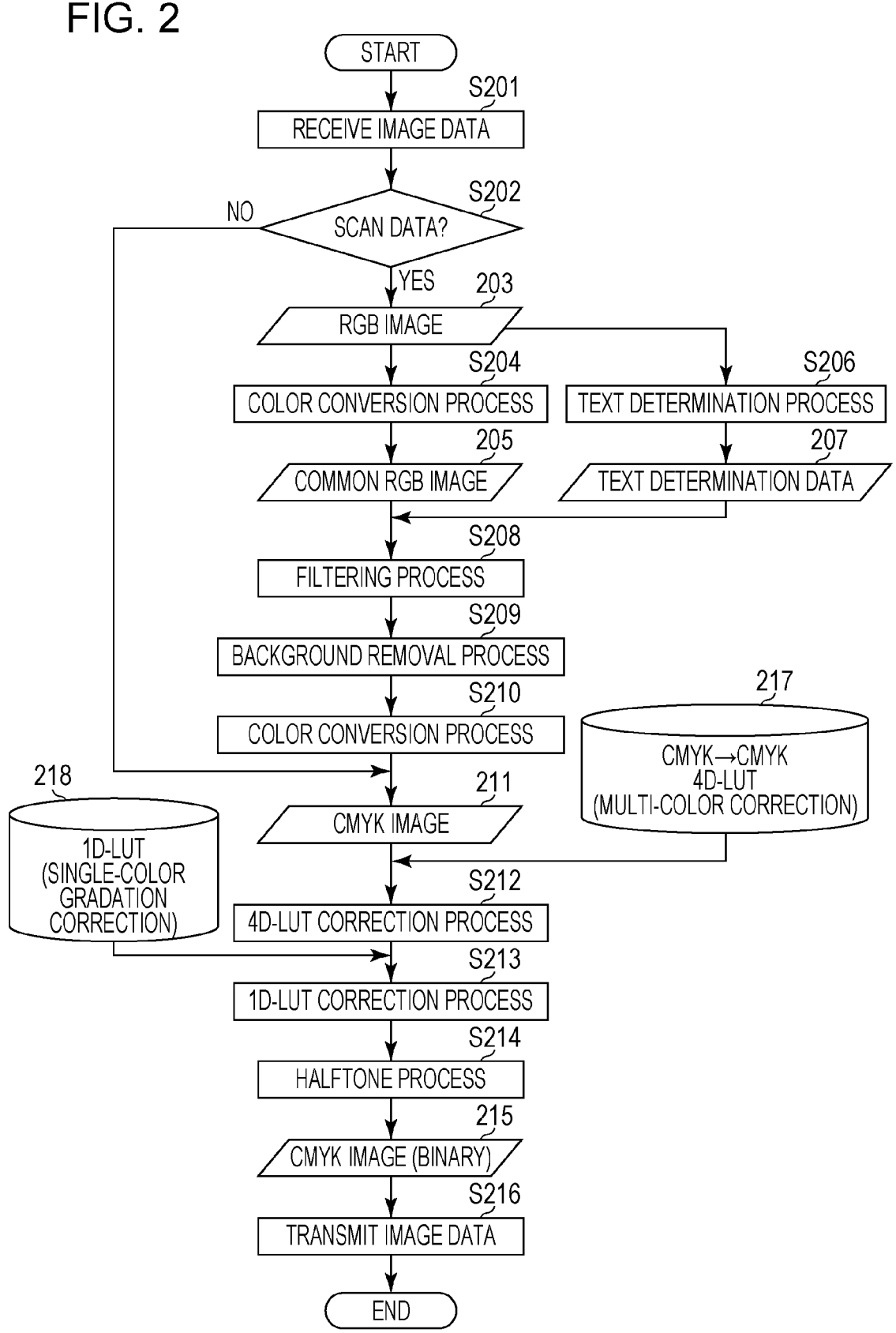
FIG. 2 is a diagram illustrating the workflow for image processing.

Next, the workflow of the image processing unit 114 will be described with reference to FIG. 2. FIG. 2 illustrates the workflow for image processing to be performed on the raster image 113 or an image read using the scanner 119. The workflow for processing illustrated in FIG. 2 is implemented by being executed by an application specific integrated circuit (ASIC) (not illustrated) in the image processing unit 114.

In step S201, image data is received. Then, in step S202, it is determined whether the received data is scan data received from the scanner 119 or represents the raster image 113 sent from the printer driver 125.

If the received data is not scan data, the received data represents the raster image 113 which is bitmap-developed by the renderer 112, and the raster image 113 is converted into a CMYK image 211 which has undergone conversion into CMYK dependent on a printer device by a CMS.

If the received data is scan data, the received data represents an RGB image 203. Thus, in step S204, a color conversion process is performed to generate a common RGB image 205. The common RGB image 205 is defined by the RGB color space, which is device-dependent, and can be converted into a device-independent color space such as the Lab color space by computation.

In step S206, a text determination process is performed to generate text determination data 207. Here, edges and so forth in the image are detected to generate the text determination data 207.

Then, in step S208, a filtering process is performed on the common RGB image 205 using the text determination data 207. Here, different filtering processes are performed on text portions and non-text portions using the text determination data 207.

Then, a background removal process is performed in step S209, and a color conversion process is further performed in step S210 to generate a CMYK image 211 from which the background has been removed.

Then, in step S212, a multi-color correction process is performed using a 4D-LUT 217. A 4D-LUT is a four-dimensional look-up table (LUT) used to convert a certain combination of signal values that are used to output C, M, Y, and K toners into a different combination of signal values for C, M, Y, and K toners. The 4D-LUT 217 is generated through "multi-color calibration" described below. The use of a 4D-LUT enables the correction of a "multi-color" image represented in a color produced using a plurality of toners.

After multi-color correction is completed in step S212, in step S213, the image processing unit 114 corrects the gradation characteristics of each of single colors of C, M, Y, and K using a 1D-LUT 218. A 1D-LUT is a one-dimensional look-up table (LUT) used to correct each of the respective C, M, Y, and K colors (single colors). The 1D-LUT is generated by means of "single-color calibration" described below.

Then, in step S214, the image processing unit 114 performs a halftone process such as a screen process or an error diffusion process to create a CMYK image (binary) 215. In step S216, the image data is transmitted to the printer 115.

"Single-color calibration" for correcting the gradation characteristics of a single-color image output from the printer 115 will be described with reference to FIG. 3. The single-color calibration enables the correction of the color reproduction characteristics of a single-color image, such as maximum density characteristics and gradation characteristics. The reproduction characteristics of the respective colors of C, M, Y, and K toners, which are used in the printer 115, are corrected together during the execution of the calibration process. In other words, the process illustrated in FIG. 3 is executed at one time in accordance with the respective C, M, Y, and K colors.

Figure 3:
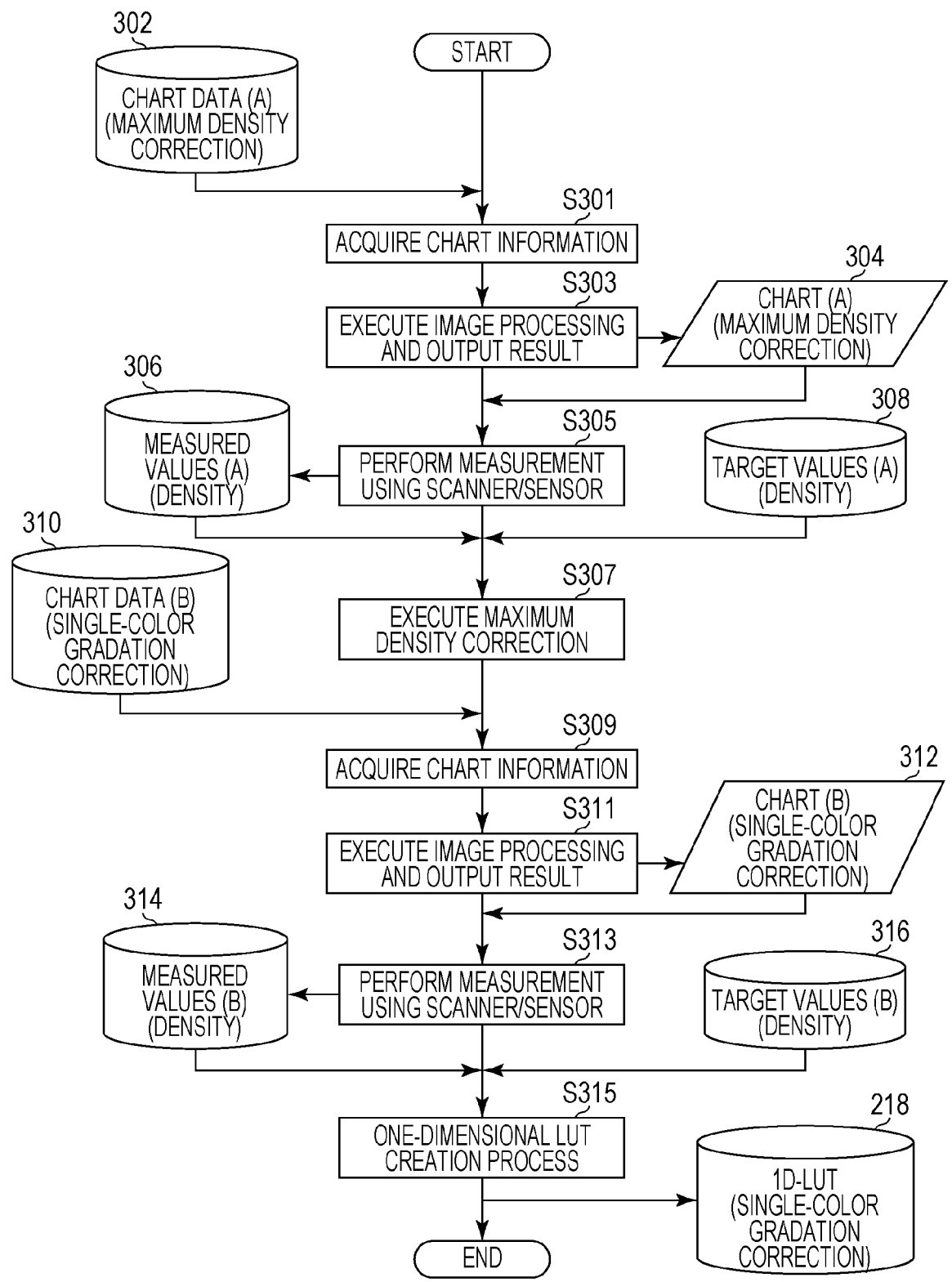
FIG. 3 is a diagram illustrating the workflow for single-color calibration.

FIG. 3 illustrates the workflow for a process for creating the 1D-LUT 218 used to correct the gradation characteristics of a single color. The workflow for the process illustrated in FIG. 3 is implemented by being executed by the CPU 103, and the created 1D-LUT 218 is saved in the storage device 121. In addition, an instruction presented to the user is displayed on a UI using the display device 118, and an instruction from the user is received through the input device 120.

In step S301, chart data (A) 302 that is stored in the storage device 121 is acquired. The chart data (A) 302 is used to correct the maximum densities of respective single colors, and has signal values (for example, 255) at which maximum density data of "single colors" of C, M, Y, and K is obtained.

Figure 5A:
FIGS. 5A to 5C are diagrams illustrating chart images used for single-color calibration and multi-color calibration.

Then, in step S303, the image processing unit 114 executes image processing on the chart data (A) 302 to print a chart image (A) 304, which is a pattern image, using the printer 115. An example is illustrated in FIG. 5A. FIG. 5A illustrates an example 501 in which the chart data (A) 302 is printed, and patch images 502, 503, 504, and 505 are printed at maximum densities of C, M, Y, and K colors, respectively. In this manner, the chart image (A) 304, which is a pattern image, includes a plurality of patch images. The image processing unit 114 performs a halftone process in step S214 but does not perform a 1D-LUT correction process in step S213 or a 4D-LUT correction process in step S212.

Then, in step S305, the density of a printed version of the chart image (A) 304 is measured using the scanner 119 or the sensor 127 in the measurement unit 126 to obtain measured values (A) 306. The measured values (A) 306 are density values of respective C, M, Y, and K colors. Then, in step S307, the maximum densities of the measured values (A) 306 of the respective colors are corrected using the measured values (A) 306 and preset target values (A) 308 of the maximum density values. Here, the device setting values of the printer 115, such as laser output and developing bias, are adjusted so that the maximum densities approach the target values (A) 308.

Figure 5B:
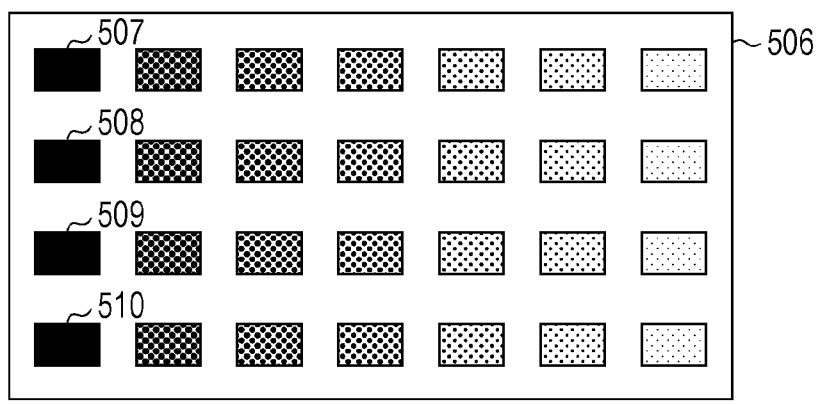

Then, in step S309, chart data (B) 310 stored in the storage device 121 is acquired. The chart data (B) 310 has signal values of gradation data of "single colors" of C, M, Y, and K. FIG. 5B illustrates an example of a chart image (B) 312, which is a pattern image having patch images printed on a recording medium using the chart data (B) 310. In FIG. 5B, an example 506 of a printed version of the chart image (B) 312 having patch images printed on a recording medium using the chart data (B) 310 is illustrated. In the illustration of FIG. 5B, patch images 507, 508, 509, and 510 and the right continuous gradation data items are composed of gradation data of the respective C, M, Y, and K colors. In this manner, the chart image (B) 312, which is a pattern image, includes a plurality of patch images.

Then, in step S311, the image processing unit 114 executes image processing on the chart data (B) 310 to print the chart image (B) 312 using the printer 115. The image processing unit 114 performs a halftone process in step S214 but does not perform a 1D-LUT correction process in step S213 or a 4D-LUT correction process in step S212. Furthermore, the printer 115 has performed maximum density correction in step S307, thus allowing the maximum densities to exhibit values equivalent to the target values (A) 308.

Then, in step S313, measurement is performed using the scanner 119 or the sensor 127 to obtain measured values (B) 314. The measured values (B) 314 are density values obtained from the gradations of each of C, M, Y, and K colors. Then, in step S315, the 1D-LUT 218 for correcting the gradations of the single colors is created using the measured values (B) 314 and preset target values (B) 316.

Next, "multi-color calibration" for correcting the characteristics of a multi-color image output from the printer 115 will be described with reference to FIG. 4. Multi-color calibration enables the correction of the reproduction characteristics of a multi-color image represented with a combination (such as superimposition) of a plurality of colors of toners. The workflow for the following process is implemented by being executed by the CPU 103 in the controller 102. The acquired 4D-LUT 217 is saved in the storage device 121. In addition, an instruction presented to the user is displayed on a UI using the display device 118, and an instruction from the user is received through the input device 120.

Multi-color calibration allows the correction of a multi-color image output from the printer 115 after the completion of single-color calibration. To this end, it is desirable that multi-color calibration be performed immediately after single-color calibration has been performed.

Figure 5C:
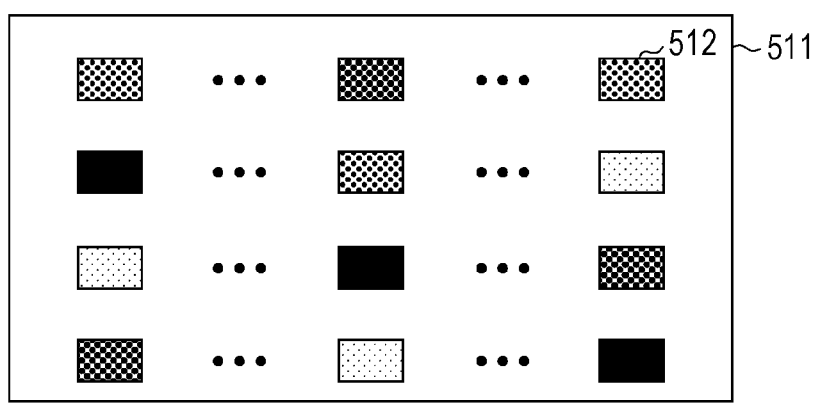

In step S401, information on "multi-color" chart data (C) 402, which is stored in the storage device 121, is acquired. The chart data (C) 402 is data used for multi-color correction, and has "multi-color" signal values that are formed of a combination of C, M, Y, and K. FIG. 5C illustrates an example of a chart image (C) 404, which is a pattern image having a plurality of patch images printed on a recording medium using the chart data (C) 402. In FIG. 5C, an example 511 of a printed version of the chart data (C) 402 is illustrated, and a patch image 512 and all the patch images printed on the example 511 are multi-color images formed of combinations of C, M, Y, and K. In this manner, the chart image (C) 404, which is a pattern image, includes a plurality of patch images.

Then, in step S403, the image processing unit 114 executes image processing on the chart data (C) 402 to print the chart image (C) 404 using the printer 115. Since multi-color calibration allows the correction of the multi-color characteristics of the device after single-color calibration has been carried out, the image processing unit 114 executes image processing using the 1D-LUT 218 created when single-color calibration is executed.

Then, in step S405, multi-color measurement of a printed version of the chart image (C) 404 is performed using the scanner 119 or the sensor 127 in the measurement unit 126 to acquire measured values (C) 406. The measured values (C) 406 indicate the multi-color characteristics of the printer 115 after single-color calibration has been carried out. The measured values (C) 406 are also values in a device-independent color space, which is implemented as the Lab color space in this exemplary embodiment. In a case where the scanner 119 is used, RGB values are converted into Lab values using a 3D-LUT or the like (not illustrated).

Then, in step S407, a LabCMY 3D-LUT 409 stored in the storage device 121 is acquired, and a LabCMY 3D-LUT (corrected) 410 is created that reflects the differences between the measured values (C) 406 and preset target values (C) 408. The LabCMY 3D-LUT is a three-dimensional LUT in which a CMY value corresponding to an input Lab value is output.

A specific creation method will now be given below. The differences between the measured values (C) 406 and the preset target values (C) 408 are added to the Lab values on the input side of the LabCMY 3D-LUT 409, and the Lab values that reflect the differences are subjected to interpolation computation using the LabCMY 3D-LUT 409. As a result, a LabCMY 3D-LUT (corrected) 410 is created.

Then, in step S411, a CMY→Lab 3D-LUT 412 stored in the storage device 121 is acquired and is subjected to computation using the Lab→CMY 3D-LUT (corrected) 410. Accordingly, a CMYK→CMYK 4D-LUT 217 is created. The CMY→Lab 3D-LUT is a three-dimensional LUT in which a Lab value corresponding to an input CMY value is output.

A specific method for creating the CMYK→CMYK 4D-LUT 217 will now be given below. A CMY→CMY 3D-LUT is created from the CMY→Lab 3D-LUT 412 and the Lab→CMY 3D-LUT (corrected) 410. Then, the CMYK→CMYK 4D-LUT 217 is created so that the input value of K coincides with the output value of K. The CMY→CMY 3D-LUT is a three-dimensional LUT in which a corrected CMY value corresponding to an input CMY value is output.

Figure 6:
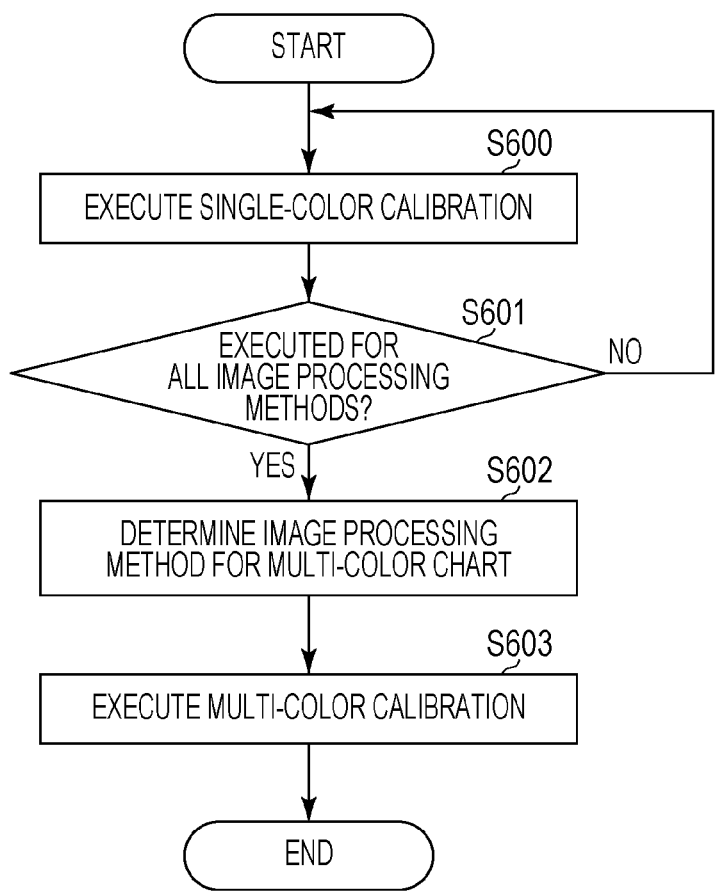
FIG. 6 is a flowchart of a processing procedure according to a first exemplary embodiment.
Figures 10, 11:
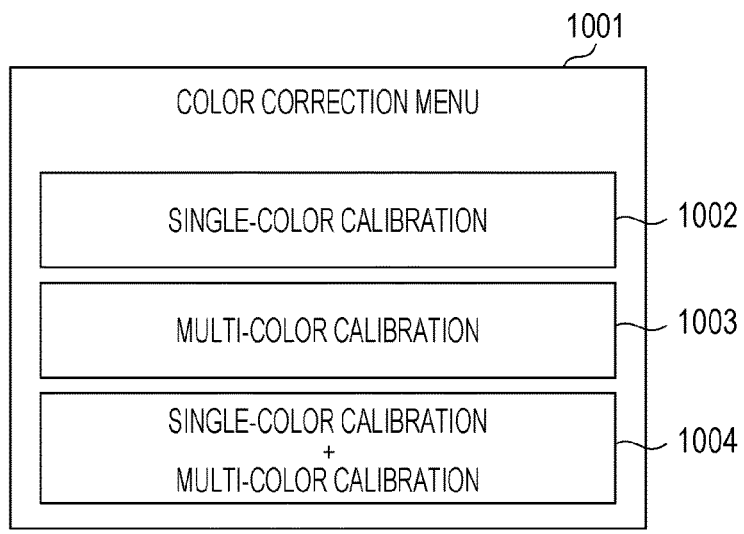
FIG. 10 is a diagram illustrating an execution screen for single-color calibration and multi-color calibration.
FIG. 11 is an illustration of examples of the reconfiguration of a chart image according to a third exemplary embodiment.

FIG. 6 illustrates an example of display on a UI for the selective execution of single-color calibration and multi-color calibration. FIG. 10 illustrates a UI screen 1001 that is displayed using the display device 118. A button 1002 is used to receive the start of single-color calibration, and a button 1003 is used to receive the start of multi-color calibration. Further, a button 1004 is a calibration start receiving button for executing multi-color calibration after the execution of single-color calibration.

When the button 1004 is selected, single-color calibration is started and executed. After that, multi-color calibration is started.

Specifically, the chart image (C) 404 for multi-color calibration is printed after the completion of single-color calibration, thereby starting multi-color calibration. Alternatively, a button for allowing the user to start multi-color calibration may be displayed on a UI screen, and multi-color calibration may be started after the user has pressed the button.

If the button 1002 is selected, only single-color calibration is executed. Likewise, if the button 1003 is selected, only multi-color calibration is executed.

The reason that different buttons are used for single-color calibration and multi-color calibration will now be described. The chart image (C) 404 that is used to execute multi-color calibration is printed using the 1D-LUT 218 created through single-color calibration. Desirably, therefore, multi-color calibration is performed immediately after the reproduction characteristics of single-color images have been corrected immediately after the execution of single-color calibration, and the reproduction characteristics of a multi-color image are corrected. However, executing two types of calibration increases the processing time taken for the user to perform calibration.

In order to reduce the processing time, either single-color calibration or multi-color calibration is executed in accordance with the user's operating environment. This results in a situation where the two types of calibration are executed with different frequencies. For example, a user having more opportunities for single-color printing less frequently executes multi-color calibration. A user having more opportunities for multi-color printing, such as photographic printing, more frequently executes multi-color calibration.

Furthermore, the timing at which the selection of a color correction menu is allowed may be controlled.

An image processing apparatus is typically in turned-off state during nighttime and in turn-on state during daytime. Thus, a user is allowed to select only the button 1004 when the main power switch of the MFP 101 is turned on and power is supplied. Alternatively, a user may be allowed to select only the button 1004 unless both types of calibration are executed within a predetermined time period. A user may also be allowed to select only the button 1004 unless both types of calibration are executed before printing is executed using a predetermined number of sheets.

Alternatively, single-color calibration and multi-color calibration may be automatically executed in sequence in the following cases: when a predetermined time period has elapsed, when printing is executed using a predetermined number of sheets, and when power is supplied.

In this manner, at a certain timing, a user is allowed to select only the button 1004 when executing calibration to facilitate the execution of multi-color calibration immediately after the execution of single-color calibration at predetermined time intervals.

Accordingly, as described above, whether to execute multi-color calibration after the execution of single-color calibration so that both types of calibration are executed or to execute one of single-color calibration and multi-color calibration may be selected. This selection makes it possible to execute calibration suitable for the usage the user wants to put it to.

In addition, performing control to allow a user to select only the execution of both types of calibration at certain time intervals makes it possible to suppress a reduction in the correction accuracy of reproduction characteristics, which is caused by calibration in a case where only either calibration is executed. In this exemplary embodiment, the operation illustrated in FIG. 6 is executed in accordance with an instruction that multi-color calibration be executed after the execution of single-color calibration in response to the selection of the button 1004 illustrated in FIG. 10.

FIG. 6 is a flowchart illustrating the workflow for a process according to this exemplary embodiment. A control program (not illustrated) for implementing this exemplary embodiment is stored in the storage device 121. The control program is loaded onto a random access memory (RAM) (not illustrated), and is executed by the CPU 103.

The illustrated technique will be described along with the workflow in the flowchart illustrated in FIG. 6. First, in step S600, single-color calibration described with reference to FIG. 3 is executed. In this case, in the execution of image processing and the output of the result in step S311, the image processing unit 114 performs a desired type of image processing method, and the 1D-LUT 218 is created after step S315. Then, in step S601, it is determined whether a 1D-LUT 218 has been generated for all the image processing methods to be applied. If a 1D-LUT 218 for all the image processing methods to be applied has not been updated, the process returns to step S600, and single-color calibration is continuously performed. In this case, the process starts with the gradation correction of step S309 while skipping the correction of maximum densities (steps S301 to S307), because the results of correction of maximum densities are the same regardless of which image processing method is be used to output a chart image in order to update a 1D-LUT.

In this case, in the execution of image processing and the output of the result in step S311, the image processing unit 114 selects an image processing method for which a chart image has not yet been output to execute single-color calibration.

There are available a plurality of types of image processing methods, such as an image processing method that is applied to the processing of scan data, an image processing method that is applied to the processing of raster data such as bitmap data in a PDL job, and an image processing method that is applied to the processing of text portions. Accordingly, the processing of step S600 is repeatedly performed a plurality of times to update the 1D-LUT 218 for a plurality of types of available image processing methods. In a case where a use is specified in advance and calibration is started, calibration may be repeatedly performed until completed using a chart image output by using the image processing method of the specified use.

Figure 9A:
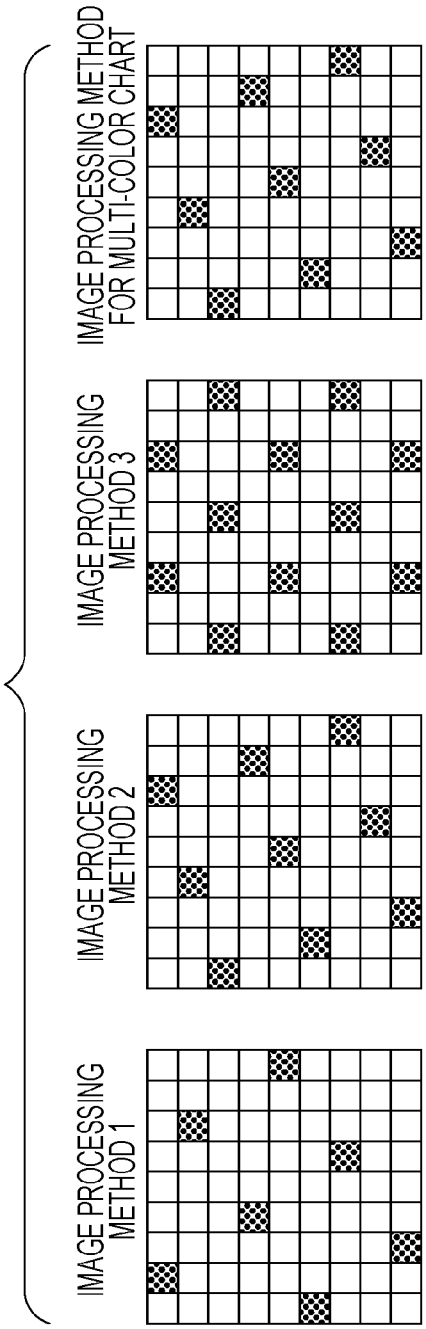
FIGS. 9A and 9B are diagrams illustrating examples of dither matrices.
Figure 9B:
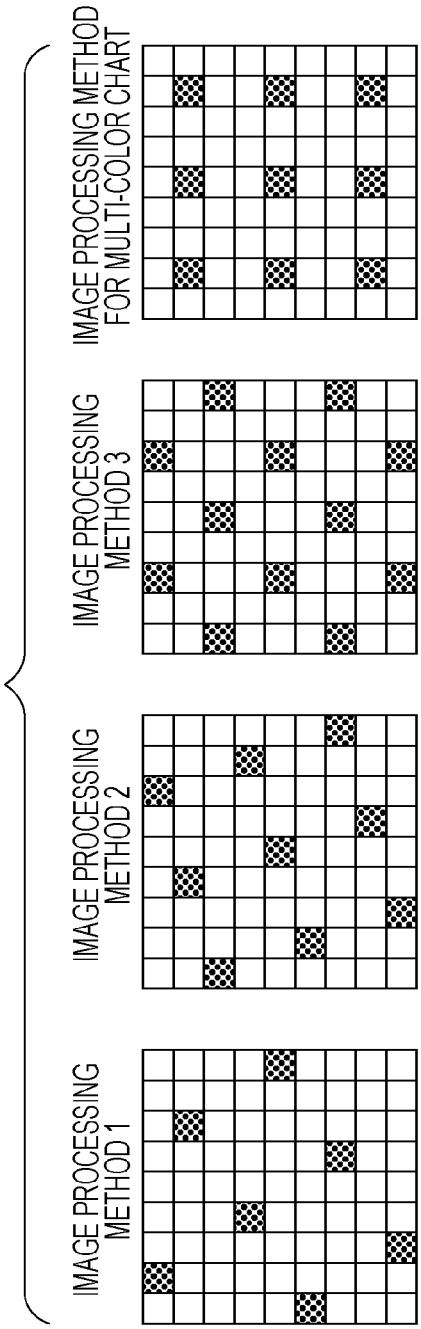

Specific examples of image processing methods will be described with reference to FIGS. 9A and 9B. FIGS. 9A and 9B illustrate examples of dither patterns generated using a pseudo-halftone process that is executed using dither matrices with different number of lines and different angles. Image processing method 1 with the smallest number of lines has high stability, and image processing method 2 having a larger number of lines is less likely to interfere with the period of an input image than image processing method 1. Image processing method 3 with the largest number of lines realizes high smoothness for the edges of characters. In this manner, each individual image processing method has a unique feature, and an optimum image processing method is used in accordance with a type of job or an object for an output image. An image processing method for multi-color charts will be described in detail below.

If it is determined in step S601 that the 1D-LUT 218 for all the image processing methods has been updated, the process proceeds to step S602, in which an image processing method for a chart image used for multi-color calibration is determined. As described previously, a plurality of image processing methods are available, and one of them may be selected, or an image processing method for multi-color correction may be set in advance. FIG. 9A illustrates dither matrices used in the former case. Specifically, image processing method 2 with an intermediate number of lines, which is one of the image processing methods used to create chart images used for single-color calibration, is selected and is used to output a chart image used for multi-color calibration. FIG. 9B illustrates dither matrices used in the latter case. Specifically, an image processing method used to output a chart image used for multi-color calibration is separate from image processing methods used to create chart images used for single-color calibration. In this case, among a plurality of available image processing methods, the image processing methods other than a first image processing method are used to output chart images used for single-color calibration. The first image processing method is used to output a chart image used for multi-color calibration.

Alternatively, an image processing method to be selected when a chart image used for multi-color calibration is output is generally determined in advance, and may be changed by a user, as desired. In general, dither patterns used for each image processing method differ depending on C, M, Y, and K. In FIGS. 9A and 9B, typical kinds of patterns are illustrated in order to give the respective features of the image processing methods. In actuality, however, a predetermined combination of respective image processing methods for C, M, Y, and K is selected as a set. The term "image processing method" is hereinafter used to refer to a set of respective image processing methods for C, M, Y, and K.

After an image processing method is determined in step S602, the process proceeds to step S603, in which multi-color calibration is executed. The details of the multi-color calibration executed in step S603 are as given in FIG. 4. In the execution of image processing in step S403, image processing is performed by applying the multi-color image processing method determined in step S602. Changes in color in a multi-color image more largely reflect changes in the state of an engine than differences between image processing methods. For this reason, each color is corrected using only one type of image processing method to achieve the effect of multi-color calibration. In addition, a plurality of types of image processing methods including not only the dithering methods described with reference to FIGS. 9A and 9B but also the error diffusion methods and the frequency modulation (FM) screening methods may be used.

In this exemplary embodiment, as described above, in multi-color calibration, correction is performed using only a chart image output by using one selected type of image processing method instead of using a plurality of chart images output by using all the image processing methods. The above correction may suppress an increase in the number of sheets to be used or the amount of toner to be used while achieving the effect of correction, and correct the reproduction characteristics of a multi-color image without increasing the user effort.

In this exemplary embodiment, furthermore, in single-color calibration, the reproduction characteristics of single-color images are corrected using the results of measurement performed using chart images created using all the image processing methods.

Accordingly, the reproduction characteristics of single-color images can be accurately corrected, and thus the correction accuracy in multi-color calibration, before which single-color calibration has been appropriately performed, may also be maintained.

Second Exemplary Embodiment

A description will now be given of only a difference from the first exemplary embodiment. In a second exemplary embodiment, multi-color calibration is performed using a chart image output by using the most frequently used image processing method in accordance with analysis of the user's operating state. The reproduction characteristics of a multi-color image may be less affected by a difference in image processing method. As may be anticipated, however, the most accurate correction is achievable for the image processing method used when a chart image for calibration is output. Accordingly, a chart image for multi-color calibration is output by using an image processing method that is frequently used by the user, thereby enabling implementation of multi-color calibration which is the most effective to the user.

Figure 7:
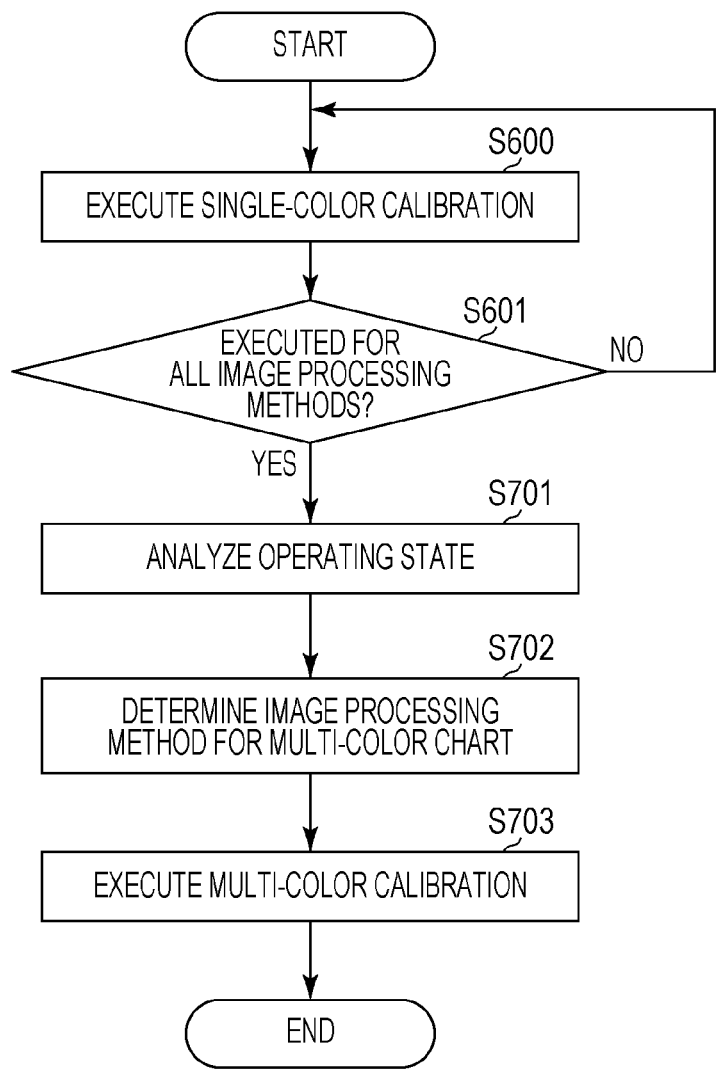
FIG. 7 is a flowchart of a processing procedure according to a second exemplary embodiment.

FIG. 7 is a flowchart illustrating the workflow for a process according to this exemplary embodiment. The difference from the first exemplary embodiment is that the user's operating state is analyzed in step S701 prior to the execution of multi-color calibration. The analysis of the user's operating state in step S701 will be described in detail with reference to FIG. 8.

Figure 8:
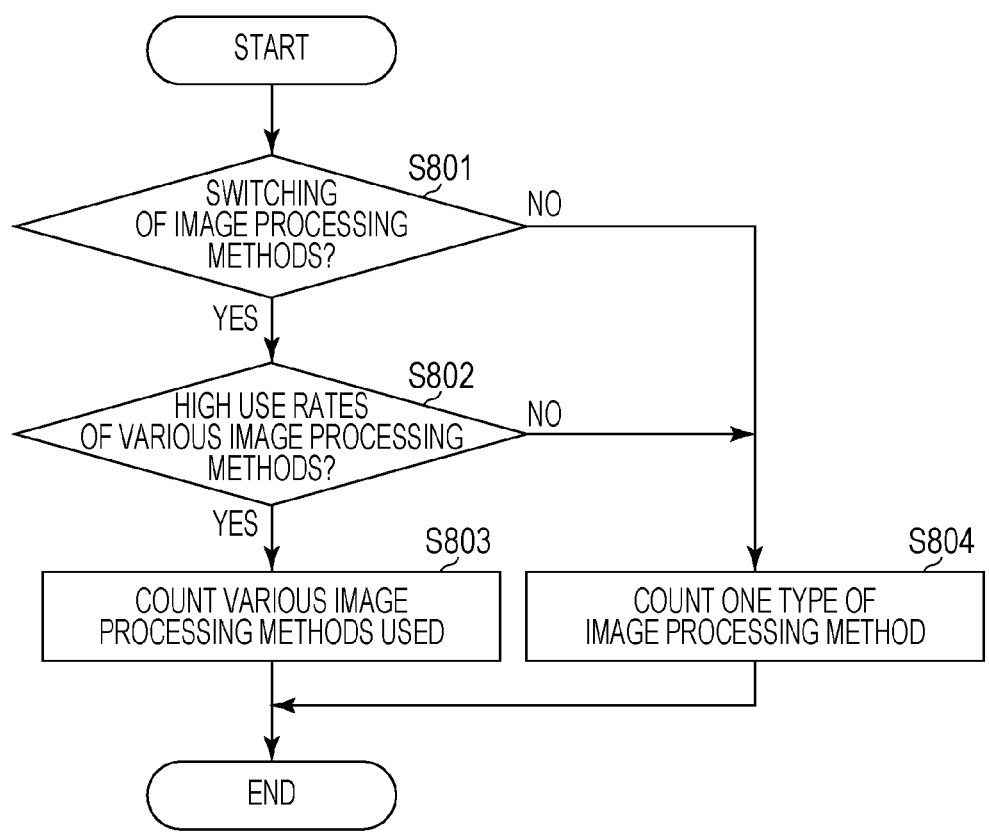
FIG. 8 is a flowchart of a processing procedure according to the second exemplary embodiment.

FIG. 8 illustrates the workflow for data collection to analyze the user's operating state in step S701. A program for analyzing the user's operating state in step S701 is stored in the storage device 121. The program is loaded onto a RAM (not illustrated), and is executed by the CPU 103. The following description will be given of the case where the raster image 113 sent from the printer driver 125 is printed, by way of example. First, in step S801, it is determined whether there are multiple image processing methods to be used when image data of one page is printed, that is, whether the switching of image processing methods is to be performed when image data of one page to be printed is formed. Since the switching of image processing methods is generally performed in accordance with image area data of an input image, whether the switching of image processing methods is to be performed is determined by referring to the image area data. Alternatively, whether the switching of image processing methods is to be performed may be determined using the other output settings, if any. If it is determined in step S801 that there is no switching of image processing methods within a page, the process proceeds to step S804. In step S804, only one type of image processing method to be used in the output operation is counted. The result of count is stored in the storage device 121. If it is determined in step S801 that there is switching of image processing methods within a page, the process proceeds to step S802.

In step S802, the use rates of various image processing methods within a page ("intra-page use rates") are acquired.

The term "intra-page use rate" refers to the use rate of each image processing method for the printing of one page.

If each of the intra-page use rates of the individual image processing methods acquired in step S802 is greater than or equal to a threshold value, the process proceeds to step S803. Then, in step S803, all the image processing methods to be used are counted. If the intra-page use rate of a specific image processing method among the intra-page use rates of the respective image processing methods acquired in step S802 is greater than or equal to the threshold value, the process proceeds to step S804. Then, in step S804, only a specific image processing method having a high intra-page use rate is counted. The threshold value used to determine whether each of the intra-page use rates is high is determined in advance. For example, the threshold value may be set to 30%. In this case, it is determined that an image processing method having an intra-page use rate of 30% or more is an image processing method having a high intra-page use rate, and that an image processing method having an intra-page use rate of less than 30% is an image processing method having a low intra-page use rate.

Referring back to the workflow illustrated in FIG. 7, in step S702, the image processing method most frequently used in a period during which data was collected is determined from the data collected in step S701.

The use rates of the individual image processing methods are obtained by determining the ratio of the number (count) of times each of the image processing methods has been used to the number (total count) of times all the image processing methods have been used. In addition, the period of counting (the period during which data is collected) may be a period from the previous execution of multi-color calibration to the analysis of the user's operating state in step S701, or may be a predetermined period such as one month. If a small number of people share the electrophotographic device (xerographic printer), it may be effective to use the count number obtained for a short period.

Then, the process proceeds to step S703, in which multi-color calibration is executed. The details of this processing are similar to that given in FIG. 4; when image processing is executed in step S403, the image processing method determined in step S702 is applied.

This exemplary embodiment has been described in the context of a technique in which, as illustrated in FIG. 8, whether the switching of image processing methods is to be performed for the printing of one page is determined, and image processing methods are counted. However, any other effective method for extracting the frequency with which an image processing method has been used may be used. For example, if different image processing methods are used for copy jobs and PDL jobs, a method for counting the switching of image processing methods for each type of job may also be effective. Accordingly, multi-color calibration is performed using a chart image created using the most frequently used image processing method through analysis of the user's operating state. This enables the correction of the reproduction characteristics of a multi-color image so as to be optimum for an image having a feature that the user frequently sees.

Third Exemplary Embodiment

A description will now be given of only a difference from the first and second exemplary embodiments. In a third exemplary embodiment, the user's operating state is analyzed in a manner similar to that in the second exemplary embodiment. A chart image is reconfigured in accordance with the operating state. Specifically, for an image processing method with a high frequency of use, correction is made using a chart image on which a relatively large number of patch images are printed. For an image processing method with a low frequency of use, a chart image is reconfigured with a reduced number of patch images.

The workflow for a process according to this exemplary embodiment is similar to that illustrated in FIG. 7; in this exemplary embodiment, a chart image is reconfigured in step S702 in which an image processing method for multi-color charts is determined.

Reconfiguration of Chart Image

After the acquisition of the use rates of image processing methods is completed in step S701 in FIG. 7, the process proceeds to step S702.

An image processing method for a chart image used for multi-color calibration is determined in the following way: Patch images included in a chart image used for multi-color calibration are rearranged in accordance with the use rates of the respective image processing methods, and the chart image is reconfigured.

First, the ratio of the counts of the number of times various image processing methods have been used is acquired from the use rates acquired in step S701. In step S702, a multi-color chart image is reconfigured in accordance with the use rates of the image processing methods obtained in step S701. The reconfiguration of the multi-color chart image may allow chart images to be output with a smaller number of sheets than that before the reconfiguration by using a plurality of image processing methods.

A description will be made with reference to a specific example illustrated in FIG. 11. Here, the printer 115 supports three types of image processing methods, image processing methods for image formation A, image formation B, and image formation C. In addition, the following situation is considered: One chart image is used for multi-color calibration to be executed for each image processing method before reconfiguration, and 200 patches are formed on the chart image. Since three types of image processing methods are available, a total of three chart images are printed for multi-color calibration before the reconfiguration of the chart image.

Here, a description will be given of the case where the chart images are reconfigured so that the number of chart images to be used for multi-color calibration is reduced to two in total. The resulting number of chart images is not limited to two, and it is only required that the number of chart images is smaller than that before reconfiguration.

A first example will be described in which the ratio of the counts of the numbers of times the image processing methods for image formation A, image formation B, and image formation C, which are acquired in step S701, have been used is 6:1:3. In this case, since the frequency of use of the image processing methods for image formation B is low, a chart image to be used for multi-color calibration is not output by using this image processing method. The chart image formed by using this image processing method is thus excluded from the chart images to be used for multi-color calibration. In this manner, the number of chart images to be used for multi-color calibration may be reduced to two in total without reconfiguring the arrangement of the patch images.

A second example will now be described in which the ratio of the counts of the numbers of times the image processing methods for image formation A, image formation B, and image formation C, which are acquired in step S701, have been used is 3:3:4. In this case, all the image processing methods are regarded as having a high frequency of use. Hence, the number of patches to be printed when the image processing method C with the highest frequency of use is used is assigned high priority, and is kept at 200 while the numbers of patches to be printed when the image processing methods A and B are used are each reduced to 100. In this way, patch images to be arranged on a chart image that is printed for multi-color calibration are reconfigured. This reconfiguration reduces the number of chart images to be used for multi-color calibration to two in total. In the reconfiguration of patch images, the number of patches to be printed per sheet may be reduced to 100 by evenly decimating the patch images from 200 patches. Alternatively, patch data in a case where the number of patches to be printed per chart image is 100 may be saved in advance in the storage device 121, and may be read.

In the reconfiguration of a chart image, the number of patches need not be reduced below the minimum number of patches required to maintain calibration accuracy. For example, in a case where calibration accuracy is maintained high with the formation of 200 patches, the minimum number of patches required to maintain calibration accuracy is approximately 80 to 100.

According to this technique, for an image processing method with a high frequency of use, or a high priority, correction is performed using a chart image on which a relatively large number of patch images are printed. For an image processing method with a low frequency of use, or a low priority, however, correction may be performed using a chart image reconfigured with a reduced number of patches. This may suppress an increase in the amount of consumption of sheets and toner, and enable efficient correction without increasing the user effort.

Figure 4:
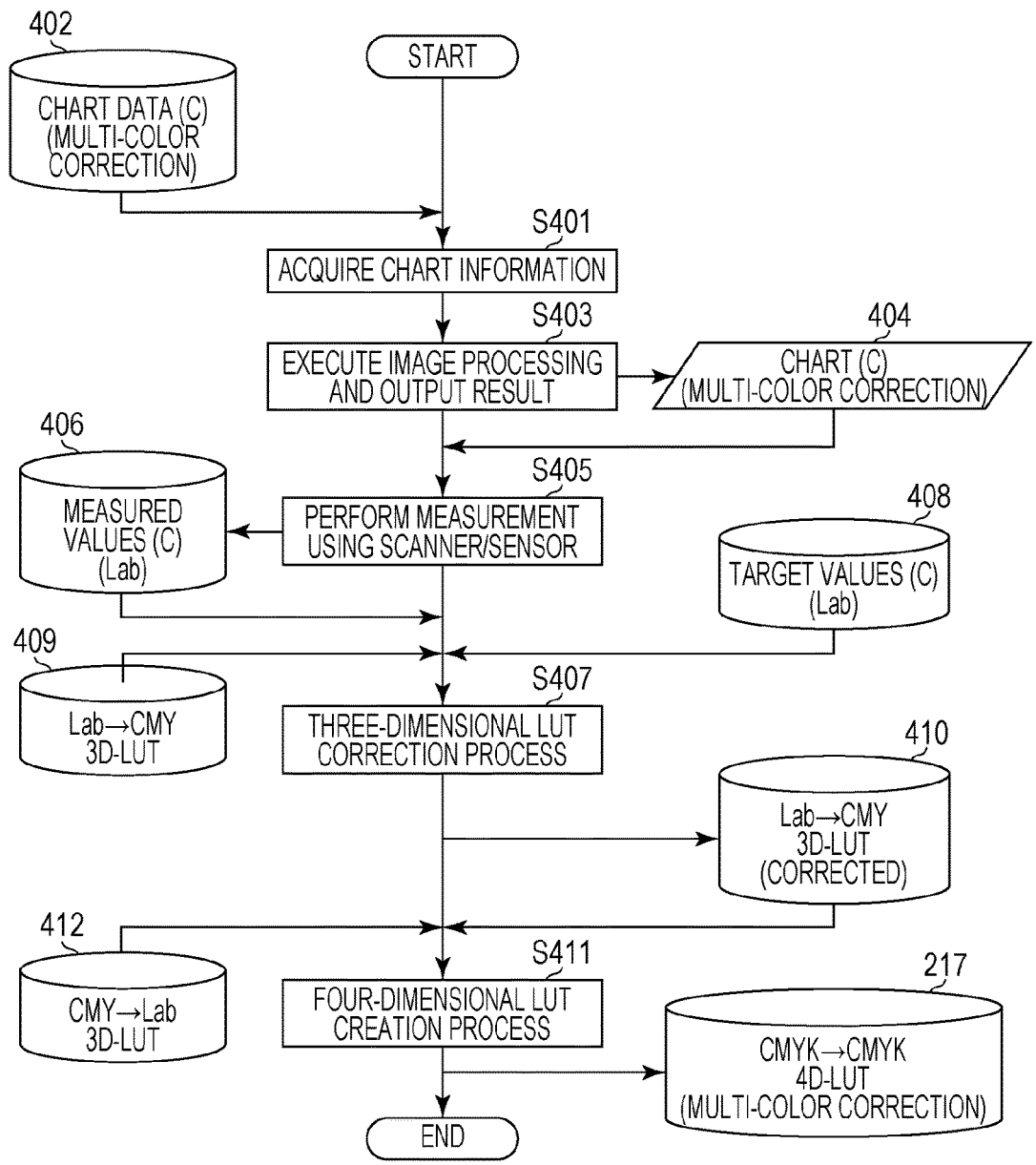
FIG. 4 is a diagram illustrating the workflow for multi-color calibration.

Furthermore, the details of multi-color calibration in step S703 with the use of this technique are similar to those illustrated in FIG. 4. However, when a chart image used for multi-color calibration is output in step S403, the multi-color chart image reconfigured in step S702 is used.

In this exemplary embodiment, the 4D-LUT 217 is created for one or more types of image processing methods. However, depending on the results of the analysis of the operating state acquired in step S701, there may be an image processing method for which no patch images are formed and thus no 4D-LUT 217 is created. To address this concern, in a case where an output that uses an image processing method which has not been used for the creation of the 4D-LUT 217 is corrected, a 4D-LUT 217 created using any other image processing method is used instead. In this case, the 4D-LUT 217 for the image processing method which has been corrected using the largest number of patches may be used instead, or the 4D-LUT 217 for an image processing method having a similar feature may be used instead.

In this exemplary embodiment, accordingly, a chart image to be used for multi-color calibration is reconfigured in accordance with the results of analysis of the user's operating state. This reconfiguration enables even an electrophotographic device (xerographic printer) shared by users operating in different environments to correct the reproduction characteristics of a multi-color image so as to be optimum for features of images that a plurality of users frequently see.

In this exemplary embodiment, furthermore, in single-color calibration, the reproduction characteristics of single-color images are corrected using the results of measurement using chart images created using all the image processing methods. Therefore, the reproduction characteristics of single-color images may be accurately corrected, and thus the correction accuracy of multi-color calibration, before which single-color calibration has been appropriately performed, may also be maintained.

Other Embodiments

Another embodiment of the present invention provides a color image processing apparatus comprising: an image forming unit configured to form a color image using recording materials of a plurality of colors; an image processing unit configured to implement a plurality of image processing methods that achieve a plurality of types of pseudo-halftone representations; a color measurement unit configured to perform color measurement of the color image formed by the image forming unit; and a control unit configured to control execution of multi-color calibration in which the color measurement unit performs color measurement of a pattern image including a plurality of multi-color patch images formed using recording materials of a plurality of colors by using a smaller number of types of image processing methods than types of a plurality of image processing methods used in single-color calibration for correcting reproduction characteristics of single-color images formed by the image forming unit and in which reproduction characteristics of a multi-color image formed by the image forming unit are corrected using a result of the color measurement.

A further embodiment of the present invention provides a control method for a color image processing apparatus, comprising: an image forming step of forming a color image using recording materials of a plurality of colors; an image processing step of implementing a plurality of image processing methods that achieve a plurality of types of pseudo-halftone representations; a color measuring step of performing color measurement of the color image formed in the image forming step; and a controlling step of controlling execution of multi-color calibration in which color measurement of a pattern image including a plurality of multi-color patch images formed using recording materials of a plurality of colors by using a smaller number of types of image processing methods than types of a plurality of image processing methods used in single-color calibration for correcting reproduction characteristics of single-color images formed in the image forming step is performed in the color measuring step and in which reproduction characteristics of a multi-color image formed in the image forming step are corrected using a result of the color measurement.

Embodiments of the present invention can also be realized by a computer of a system or apparatus that reads out and executes computer executable instructions recorded on a storage medium (e.g., non-transitory computer-readable storage medium) to perform the functions of one or more of the above-described embodiment(s) of the present invention, and by a method performed by the computer of the system or apparatus by, for example, reading out and executing the computer executable instructions from the storage medium to perform the functions of one or more of the above-described embodiment(s). The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the foregoing exemplary embodiments have been described in the context of an electrophotographic device (xerographic printer) by way of example, any other printer such as an inkjet printer or a thermal printer may be used, and the embodiments of the present invention are not limited to a specific type of printer. Furthermore, a recording material has been described in the context of toner for electrophotographic printing, by way of example. The recording material to be used for printing is not limited to toner, and any other recording material such as ink may be used. Thus, the embodiments of the present invention are not limited to a specific type of recording material.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

What is claimed is:

1. A color image processing apparatus comprising:
   an image forming unit configured to form a color image using recording materials of a plurality of colors;
   an image processing unit configured to implement a plurality of image processing methods that achieves a plurality of types of halftone representations;
   a color measurement unit configured to perform color measurement of the color image formed by the image forming unit;
   a single-color calibration unit configured to execute single-color calibration by causing the color measurement unit to perform color measurement of a pattern image including a plurality of single-color patch images that is formed using a same single-color recording material, among a plurality of single-color recording materials, and that has densities different from one another, the plurality of single-color patch images being formed for each of the plurality of single-color recording materials by the image forming unit, and then acquiring, based on a result of the color measurement by the color measurement unit, a correction data to be used to bring a reproduction characteristic of a single-color image formed by the image forming unit close to a first target value; and
   a multi-color calibration unit configured to execute multi-color calibration by causing the color measurement unit to perform color measurement of a pattern image including a plurality of multi-color patch images having colors different from one another, each of which is formed using multiple color recording materials by the image forming unit, and then acquiring, based on results of the color measurement by the color measurement unit, correction data to be used to bring a reproduction characteristic of a multi-color image formed by the image forming unit close to a second target value,
   wherein two or more image processing methods among the plurality of image processing methods are used to form the pattern image including the plurality of single-color patch images during the single-color calibration, and
   one or more image processing methods among the plurality of image processing methods are used to form the pattern image including the plurality of multi-color patch images during the multi-color calibration, and
   a number of image processing methods used at a time of forming the pattern image including the plurality of multi-color patch images is smaller than a number of image processing methods used at a time of forming the pattern image including the plurality of single-color patch images.

2. The color image processing apparatus according to claim 1, wherein the image processing method used to form the pattern image including the plurality of multi-color patch images is a preset image processing method.

3. The color image processing apparatus according to claim 1, wherein, in the multi-color calibration, a conversion table for converting device-independent color space into three-dimensional color space is corrected by using a difference value between each of the results of the color measurement and the second target value corresponding thereto.

4. The color image processing apparatus according to claim 1, wherein the image processing method used to form the pattern image including the plurality of multi-color patch images is one type of image processing method among the plurality of image processing methods used in the single-color calibration.

5. The color image processing apparatus according to claim 1, wherein the pattern image including the plurality of multi-color patch images, which is formed during the multi-color calibration, is formed by using a first image processing method, and the first image processing method is not used to execute the single-color calibration.

6. The color image processing apparatus according to claim 1, wherein the plurality of image processing methods include a dithering method or an error diffusion method.

7. The color image processing apparatus according to claim 1, wherein the correction data acquired by the multi-color calibration unit is used as a correction value corresponding to an image processing method not used to form the pattern image.

8. A method for controlling a color image processing apparatus including an image forming unit, the method comprising:
   an image processing step of implementing a plurality of image processing methods that achieves a plurality of types of halftone representations;

a color measuring step of performing color measurement of the color image formed by the image forming unit;

a single-color calibration step of executing single-color calibration by causing the color measurement step to perform color measurement of a pattern image including a plurality of single-color patch images that is formed using a same single-color recording material, among a plurality of single-color recording materials, and that has densities different from one another, the plurality of single-color patch images being formed for each of the plurality of single-color recording materials by the image forming unit, and then acquiring, based on a result of the color measurement by the color measurement step, a correction data to be used to bring a reproduction characteristic of a single-color image formed by the image forming unit close to a first target value; and a multi-color calibration step of executing multi-color calibration by causing the color measuring step to perform color measurement of a pattern image including a plurality of multi-color patch images having colors different from one another, each of which is formed using multiple color recording materials by the image forming unit, and then acquiring, based on results of the color measurement by the color measuring step, correction data to be used to bring a reproduction characteristic of a multi-color image formed by the image forming unit close to a second target value, wherein two or more image processing methods among the plurality of image processing methods are used to form the pattern image including the plurality of single-color patch images during the single-color calibration, and one or more image processing methods among the plurality of image processing methods are used to form the pattern image including the plurality of multi-color patch images during the multi-color calibration, and a number of image processing methods used at a time of forming the pattern image including the plurality of multi-color patch images is smaller than a number of image processing methods used at a time of forming the pattern image including the plurality of single-color patch images.

9. The method according to claim 8, wherein the image processing method used to form the pattern image including the plurality of multi-color patch images is a preset image processing method.

10. The method according to claim 8, wherein, in the multi-color calibration, a conversion table for converting device-independent color space into three-dimensional color space is corrected by using a difference value between each of the results of the color measurement and a target value corresponding thereto.

11. The method according to claim 8, wherein the image processing method used to form the pattern image including the plurality of multi-color patch images is one type of image processing method among the plurality of image processing methods used in the single-color calibration.

12. The method according to claim 8, wherein the pattern image including the plurality of multi-color patch images, which is formed during the multi-color calibration, is formed using a first image processing method, and the first image processing method is not used to execute the single-color calibration.

13. The method according to claim 8, wherein the plurality of image processing methods include a dithering method or an error diffusion method.

14. The method according to claim 8, wherein the correction data acquired by the multi-color calibration step is used as a correction value corresponding to an image processing method not used to form the pattern image.

15. A non-transitory computer-readable storage medium storing a program for causing a computer to execute a method for controlling a color image processing apparatus including an image forming unit, the method comprising:

an image processing step of implementing a plurality of image processing methods that achieves a plurality of types of halftone representations;

a color measuring step of performing color measurement of the color image formed by the image forming unit;

a single-color calibration step of executing single-color calibration by causing the color measurement step to perform color measurement of a pattern image including a plurality of single-color patch images that is formed using a same single-color recording material, among a plurality of single-color recording materials, and that has densities different from one another, the plurality of single-color patch images being formed for each of the plurality of single-color recording materials by the image forming unit, and then acquiring, based on a result of the color measurement by the color measurement step, a correction data to be used to bring a reproduction characteristic of a single-color image formed by the image forming unit close to a first target value; and a multi-color calibration step of executing multi-color calibration by causing the color measuring step to perform color measurement of a pattern image including a plurality of multi-color patch images having colors different from one another, each of which is formed using multiple color recording materials by the image forming unit, and then acquiring, based on results of the color measurement by the color measuring step, correction data to be used to bring a reproduction characteristic of a multi-color image formed by the image forming unit close to a second target value, wherein two or more image processing methods among the plurality of image processing method are used to form the pattern image including the plurality of single-color patch images during the single-color calibration, and one or more image processing methods among the plurality of image processing methods are used to form the pattern image including the plurality of multi-color patch images during the multi-color calibration, and a number of image processing methods used at a time of forming the pattern image including the plurality of multi-color patch images is smaller than a number of image processing methods used at a time of forming the pattern image including the plurality of single-color patch images.

16. A color image processing apparatus comprising:

an image forming unit configured to form a color image using recording materials of a plurality of colors;

an image processing unit configured to be capable of executing a plurality of types of halftone processes;

a color measurement unit configured to perform color measurement of the color image formed by the image forming unit;

a single-color calibration unit configured to execute single-color calibration by causing the color measurement unit to perform color measurement of a pattern image including a plurality of single-color patch images that is formed using a same single-color recording material, among a plurality of single-color recording materials, and that has densities different from one another, the plurality of single-color patch images being formed for each of the plurality of single-color recording materials by the image forming unit, and then acquiring, based on a result of the color measurement by the color measurement unit, a correction data to be used to bring a reproduction characteristic of a single-color image formed by the image forming unit close to a first target value; and a multi-color calibration unit configured to execute multi-color calibration by causing the color measurement unit to perform color measurement of a pattern image including a plurality of multi-color patch images having colors different from one another, each of which is formed using multiple color recording materials by the image forming unit, and then acquiring, based on results of the color measurement by the color measurement unit, correction data to be used to bring a reproduction characteristic of a multi-color image formed by the image forming unit close to a second target value, wherein a number of halftone processes, to be processed by the image processing unit, used at a time of forming the pattern image including the plurality of multi-color patch images is smaller than a number of halftone processes, to be processed by the image processing unit, used at a time of forming the pattern image including the plurality of single-color patch images.

* * * * *